UNITED STATES PATENT OFFICE.

RANSOM F. HUMISTON, OF BOSTON, MASSACHUSETTS.

COMPOUND FOR PRESERVING FOOD.

SPECIFICATION forming part of Letters Patent No. 270,899, dated January 23, 1883.

Application filed July 28, 1882. (No specimens.)

*To all whom it may concern:*

Be it known that I, RANSOM F. HUMISTON, of Boston, Massachusetts, have invented a certain new and useful compound to be used for preserving food and other organic substances, of which the following is a specification.

The compound in which my invention is comprised consists of borax, sulphite of calcium, or its equivalent in the form of bisulphite of calcium, salt, and glucose, taken in substantially the proportions hereinafter stated.

To fifteen liters of water I add borax sufficient to make a saturated solution at a temperature of about 15° centigrade. To this I add from one to two grams (more or less) of sulphite of calcium or its equivalent value in the form of bisulphite of calcium. The lime in this ingredient is precipitated on account of the superior affinity of the sulphurous acid for the soda with which it unites, and this precipitate can be separated from the solution by ordinary methods. To the foregoing I add salt in the proportion of from 0.06 to 0.18 kilogram, and I also add glucose in the proportion of 0.06 kilogram. The boracic acid of which the borax is mainly composed is a known and exceedingly-effective antiseptic and preservative. The sulphite of calcium is a valuable anti-ferment in the destruction of fungi, &c., and the salt and glucose enhance the antiseptic properties of the compound and also mollify its taste. The strength of the compound may, if desired, be reduced by the addition of water.

For convenience of handling and transportation, I preferably reduce the antiseptic solution to a solid homogeneous mass by evaporating the liquid portion, and I then bring the mass to the condition of a powder, which may be dissolved in water whenever an antiseptic solution is needed.

In conclusion, I state that I do not claim the use, as an antiseptic or preservative agent, of any one of the hereinbefore-mentioned ingredients separately considered; but What I do claim is—

The hereinbefore-described preserving compound, consisting of borax or biborate of soda, sulphite of calcium, salt, and glucose, taken in the proportions substantially as specified.

In testimony whereof I have hereunto set my hand this 27th day of July, A. D. 1882.

R. F. HUMISTON.

Witnesses:
EWELL A. DICK,
WALTER BLANDFORD.